United States Patent
Paivansalo et al.

(10) Patent No.: US 11,513,324 B2
(45) Date of Patent: Nov. 29, 2022

(54) CAMERA MODULE

(71) Applicant: AAC Optics Solutions Pte. Ltd., Singapore (SG)

(72) Inventors: Eero Sakari Paivansalo, Tampere (FI); Kawai Takahiro, Osaka (JP); Kenji Oinuma, Osaka (JP); Johan Sand, Tampere (FI)

(73) Assignee: AAC Optics Solutions Pte. Ltd., Singapore (SG)

( * ) Notice: Subject to any disclaimer, the term of this patent is extended or adjusted under 35 U.S.C. 154(b) by 89 days.

(21) Appl. No.: 17/098,434

(22) Filed: Nov. 15, 2020

(65) Prior Publication Data

US 2022/0155566 A1     May 19, 2022

(51) Int. Cl.
| | |
|---|---|
| *G02B 13/00* | (2006.01) |
| *H04N 5/225* | (2006.01) |
| *G02B 7/02* | (2021.01) |
| *G02B 13/06* | (2006.01) |
| *G02B 5/20* | (2006.01) |

(52) U.S. Cl.
CPC ......... *G02B 13/0085* (2013.01); *G02B 5/208* (2013.01); *G02B 7/021* (2013.01); *G02B 13/06* (2013.01); *H04N 5/2253* (2013.01); *H04N 5/2254* (2013.01)

(58) Field of Classification Search
CPC .... G02B 13/0085; G02B 5/208; G02B 7/021; G02B 13/06; H04N 5/2253; H04N 5/2254
See application file for complete search history.

(56) References Cited

U.S. PATENT DOCUMENTS

| | | | | |
|---|---|---|---|---|
| 11,201,993 | B1* | 12/2021 | Wang | G02B 3/0056 |
| 2004/0240052 | A1* | 12/2004 | Minefuji | H04N 5/2254 |
| | | | | 359/435 |
| 2009/0225203 | A1* | 9/2009 | Tanida | H04N 5/3415 |
| | | | | 348/262 |
| 2011/0080487 | A1* | 4/2011 | Venkataraman | H04N 5/2254 |
| | | | | 348/E5.024 |
| 2011/0134282 | A1* | 6/2011 | Morita | G02B 13/001 |
| | | | | 348/222.1 |
| 2011/0228142 | A1* | 9/2011 | Brueckner | G02B 27/0025 |
| | | | | 348/E5.079 |
| 2014/0002688 | A1* | 1/2014 | Inoue | H04N 5/2258 |
| | | | | 348/222.1 |
| 2015/0116527 | A1* | 4/2015 | Rossi | H04N 5/3415 |
| | | | | 348/218.1 |

(Continued)

*Primary Examiner* — Abdelaaziz Tissire
(74) *Attorney, Agent, or Firm* — W&G Law Group

(57) ABSTRACT

A camera module includes a circuit board; an image sensor mounted on the circuit board and electrically connected with the circuit boards, the image sensor comprising an array of focal planes; a barrel mounted on the circuit board with a cavity formed between the barrel and the circuit board, the image sensor being received in the cavity; and a lens stack array mounted to the barrel and spaced from the image sensor, the lens stack array comprising a plurality of first lens stacks, second lens stacks, third lens stacks, each of the lens stacks corresponding to one of the focal planes. The first lens stacks, the second lens stacks and the third lens stacks have different field of view and are combined in a single camera module, which enables a compact solution in a form of single camera module that traditionally requires multiple camera modules.

7 Claims, 4 Drawing Sheets

(56) References Cited

U.S. PATENT DOCUMENTS

| 2015/0256745 A1* | 9/2015 | Oniki | G02B 3/0037 |
| | | | 348/335 |
| 2016/0124195 A1* | 5/2016 | Chern | G02B 13/009 |
| | | | 359/741 |
| 2016/0252734 A1* | 9/2016 | Rossi | H01L 27/14625 |
| | | | 348/340 |

* cited by examiner

CAMERA MODULE

FIELD OF THE INVENTION

The present disclosure relates to the field of optical imaging, and in particular, to a camera module.

BACKGROUND

With the improvement of living standards, people have higher and higher requirements for the camera function in the lens module. Traditional lens modules usually have only one lens barrel and a lens stack mounted in the lens barrel. However, in the lens modules with a single lens barrel, the size of the photosensitive element is usually limited. The captured photos have problem of unclear and other issues. Therefore, the lens module with a single lens barrel can no longer meet people's needs for camera functions at this stage.

Currently, multi-lens modules with better camera effects appear on the market. The multi-lens module which comprises multiple lens barrels and multiple lens stacks mounted in the lens barrels respectively, can easily realize functions such as multiple optical zoom, 3D effects, pixel synthesis and so on, which can greatly meet people's needs for camera functions. However, the conventional multi-lens modules have many components, which results in inconvenience in the assembly of the lens module. Furthermore, the conventional multi-lens modules have dedicated/separate lens modules such as ultra-wide lens module, wide lens module or telephoto lens modules and perform only one optic behaviour each time.

Therefore, it is desired to provide an improved camera module which can overcome at least one of the above problems.

SUMMARY

Accordingly, the present disclosure is directed to an improved camera module with multiple lens stacks.

In one aspect, the present disclosure provides a camera module which comprises a circuit board; an image sensor mounted on the circuit board and electrically connected with the circuit boards, the image sensor comprising an array of focal planes; a barrel mounted on the circuit board with a cavity formed between the barrel and the circuit board, the image sensor being received in the cavity; and a lens stack array mounted to the barrel and spaced from the image sensor, the lens stack array comprising a plurality of first lens stacks and second lens stacks, each of the lens stacks corresponding to one of the focal planes. The first lens stacks and the second lens stacks have different field of view (FOV).

In some embodiments, at least one of the lens stacks is capable of be tilted relative to a normal line of the focal planes.

In some embodiments, one of the second lens stacks is tilted relative to a normal line of the focal planes in a clockwise direction and another of the second lens stacks is tilted relative to the normal line of the focal planes in an anticlockwise direction.

In some embodiments, the lens stack array is a micro-lens stack array comprises a plurality of micro lens.

In some embodiments, the camera module further comprises a plurality of third lens stacks which have field of view different from that of the first and second lens stacks.

In some embodiments, the first lens stack is formed by ultra-wide micro-lenses stacked one above the other, the second lens stack is formed by wide micro-lenses stacked one above the other and the third lens stack is formed by telephoto micro-lenses stacked one above the other.

In some embodiments, the lens stack array further comprises a first lens plate, a spacer plate, a second lens plate which defines a plurality of coaxial apertures, each of the lens stacks comprises a pair of lenses respectively attached in a corresponding aperture of the first lens plate and the second lens plate.

In some embodiments, at least one of the lens stacks is tilted relative to a normal line of the focal plane and the at least one of the lens stacks is rotatable relative to the first and second lens plates.

In some embodiments, the camera module further comprises an IR cut filter located between the image sensor and the lens stack array.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

Figure 1:
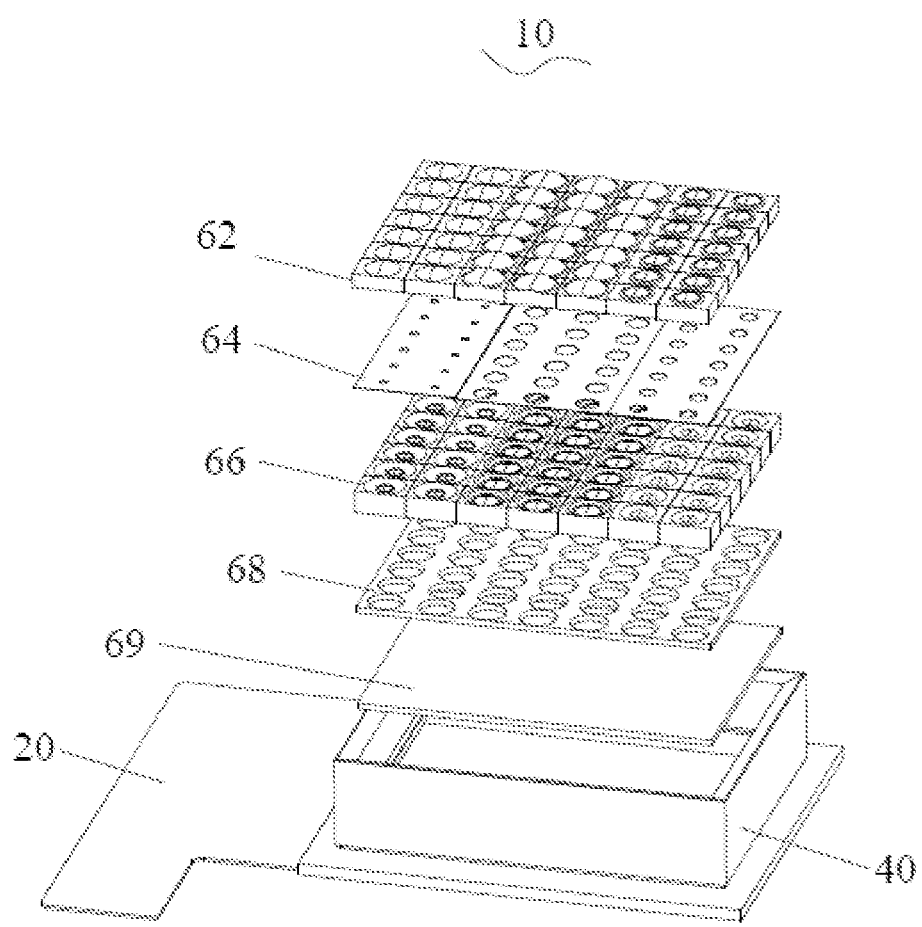
FIG. 1 is a schematic exploded view of a camera module in accordance with an exemplary embodiment of the present disclosure.

The present disclosure will be further illustrated with reference to the accompanying drawings. It shall be noted that the elements of similar structures or functions are represented by like reference numerals throughout the figures. The embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

Figure 2:
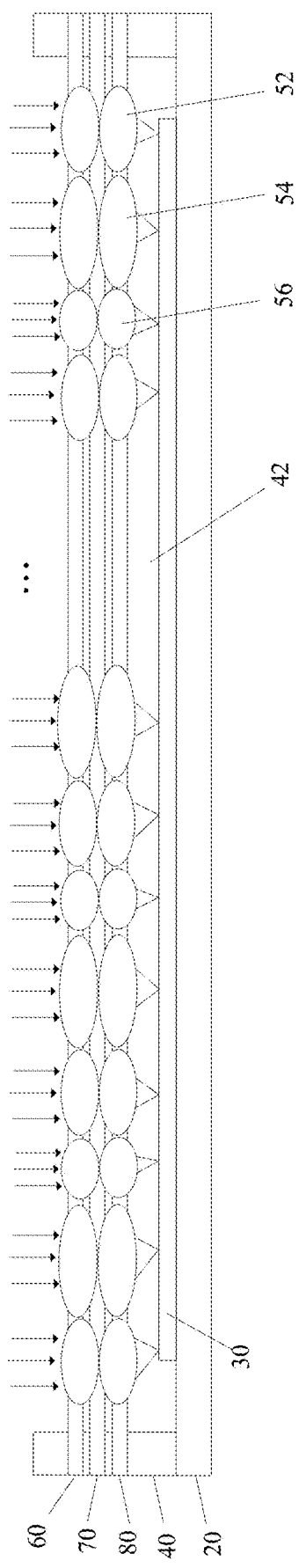
FIG. 2 is a cross sectional view of the camera module in accordance with an exemplary embodiment of the present disclosure.

Referring to FIGS. 1 and 2, a camera module 10 comprises a circuit board 20, an image sensor 30 mounted on the circuit board 20 and electrically connected with the circuit boards 20. A barrel 40 is mounted on the circuit board 20 with a cavity 42 formed there between. The image sensor 30 is received in the cavity 42 and surrounded by the barrel 40. The image sensor 30 comprises an array of focal planes.

The camera module 10 further comprises a lens stack array 50 mounted to the barrel 40 and spaced from the image sensor 30. The lens stack array 50 comprises a plurality of first lens stacks 52, second lens stacks 54 and third lens stacks 56 each corresponding to one of the focal planes.

In some embodiments, the first lens stacks 52, the second lens stacks 54 and the third lens stacks 56 have different FOV. For example, the first lens stacks 52 have a field of view smaller than that of the second lens stacks 54. The first lens stacks 52 have a field of view greater than that of the third lens stacks 56. Multiple different FOV optics array lens stacks are combined in a single camera module, which enables a very compact solution in a form of single camera module that traditionally requires at least three camera modules.

In some embodiments, the lens stack array 50 is a micro-lens stack array which comprises a plurality of micro lens.

In some embodiments, the first lens stack 52 is formed by wide micro-lenses stacked one above the other, the second lens stack 54 is formed by ultra-wide micro-lenses stacked one above the other and the third lens stack 56 is formed by telephoto micro-lenses stacked one above the other. The ultra-wide micro-lenses have a FOV greater than that of the wide micro-lenses. The wide micro-lenses have a FOV greater than that of the telephoto micro-lenses. For example, the ultra-wide micro-lenses have a FOV of 120 degrees. The wide micro-lenses have a FOV of 71 degrees. The telephoto micro-lenses have a FOV of 28 degrees.

In some embodiments, the lens stack array 50 further comprises a first lens plate 62, a first spacer plate 64, a second lens plate 66 and a second spacer plate 68. The first spacer plate 64 is located between the first lens plate 62 and the second lens plate 66. The first lens plate 62, the spacer plate 64, the second lens plate 66 and the second spacer plate 68 define an array of coaxial apertures. Preferably, the coaxial apertures defined in the first lens plate 62, the spacer plate 64, the second lens plate 66 and the second spacer plate 68 are perpendicular to the focal planes of the image sensor 30. The lenses are secured in the corresponding apertures of the first and second plates 62, 66. The adjacent lenses in the same stack are spaced from each other by the first spacer plate 70. The lenses form an array of lenses that are mechanically attached to each other to form a module.

In some embodiments, the camera module 10 further comprises an IR cut filter 69 which is attached on a surface of the second spacer plate 68 away from the second lens plate 66.

Figure 3:
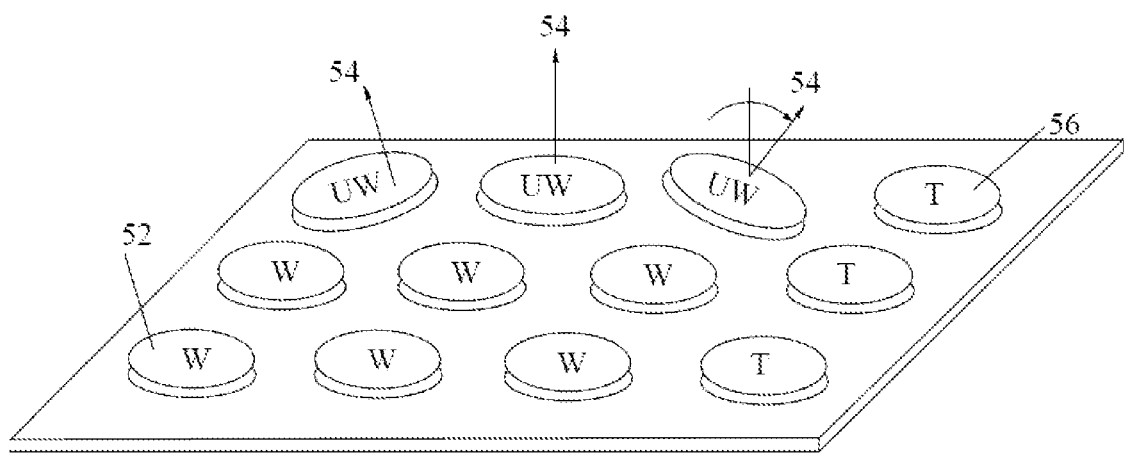
FIG. 3 is a schematic view of a lens stack array in accordance with an exemplary embodiment of the present disclosure.

Referring to FIG. 3, at least one of the first lens stacks 52, the second lens stacks 54 and the third lens stacks 56 is tilted relative to the normal line of the focal plane for covering more FOV. In the embodiment as shown in FIG. 3, two of the ultra-wide micro-lenses stacks 54 are tilted relative to the normal line of the focal planes for covering more FOV. One of the ultra-wide micro-lenses stacks 54 is tilted relative the normal line of the focal plane in a clockwise direction and the other of the ultra-wide micro-lenses stacks 54 is tilted relative the normal line of the focal plane in an anti-clockwise direction. It should be understood that the wide lenses or telephoto lenses can be tilted according to design requirement. Tilting of the lens stacks of the array can provide more FOV for the array such that the array of lenses can cover ("see") wider FOV compared to a single lens or array of lenses that all are "looking" in the same direction. The tilted lens stacks may be stationary relative to the lens plate. For example, the tilted lens stacks are integrally formed with the lens plate by molding. Alternatively, the tilted lens stacks may be rotatable relative to the lens plate to adjust the tilting angle with respect to the normal line of the focal plane. For example, an actuator is applied for adjusting the tilting angle of the lens stacks. Actuated lens array can correct e.g. field curvature errors and adapt to environmental changes like temperature drift. It is possible to achieve many different optical functions by programming the orientation of the lens stacks. This will give many benefits compared to lens design with fixed orientation.

In the embodiment as shown in FIG. 3, the first lens stacks 54, for example the ultra-wide micro-lenses, are located in a first area which is spaced from a second area in which the second lens stacks 52, for example the wide micro-lenses, are located. The third lens stacks 56, for example the telephoto micro-lenses, are located in a third area which is spaced from the first and second areas.

Figure 4:
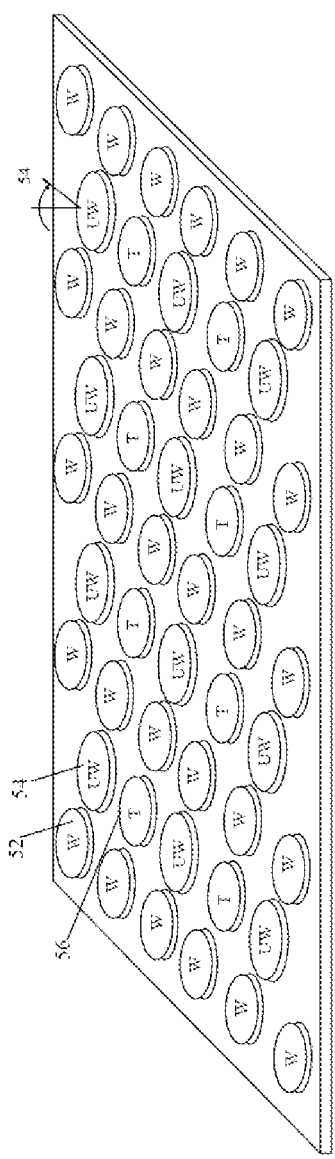
FIG. 4 is a schematic view of a lens stack array in accordance with another exemplary embodiment of the present disclosure.

Referring to FIG. 4, the first lens stacks 52, the second lens stacks 54 and the third lens stacks 56 can be mixed. That is, the areas in which the first lens stacks 52 are located are overlapped with the areas where the second lens stacks 54 and the third lens stacks 56 are located. For example, the ultra-wide micro-lens stacks and the telephoto lens stacks are alternatingly arranged between adjacent rows of wide micro-lens stacks. It should be understood that other lens patterns are also possible.

Operation of the array lenses of the camera module of the present application is similar to that of the lenses of traditional camera module except it combines multiple different FOV images to the large sensor area. In above example with 108Mpix sensor the image on top of the sensor area will be consisted of 12 UW, 30 wide and 8×T miniature images. Final composite image will be generated by image processing from miniature images. Image processing algorithms can be developed e.g. by using machine learning with neural network.

In the present application, different FOV lenses are integrated in a single optics array lens/camera module which enables simultaneous image project to a sensor surface with different FOV and can perform a wide FOV and zoom (narrow FOV) at the same time. Traditionally, this requires multiple separate camera modules. Advantage for the customer is to use only one camera module instead of multiple modules for the same function. The number and formation of the individual lenses in the array can change. Even for the same application purpose there are many suitable solutions. Shape and dimension on the lenses can vary a lot.

Combining this simple array camera module with neural network image processing in order to improve image quality. This approach can make camera module designs thinner compared to traditional ones. It allows more field curvature and distortion to be tolerated due to NN processing.

Performance and resolution of the multipurpose array lens and camera module benefit from using high resolution (e.g. 108Mpix) imaging sensor. Array lenses can cover large sensor area without high cost. The construction of the camera module is simple and thin. Traditional high-end products with 108Mpix sensor have many lens elements in a stack, which results in the lens module being thick.

When the lenses in the multipurpose array camera have different viewing angles there is possibility for stereoscopic 3D imaging/mapping to be performed.

This technology enables the usage of slim compound eye lens designs. Individual images through micro-lens stacks can be combined into composite image by (Neural network) (NN) processing. The design of the present application has similarities compared to insect eye design found in nature. Machine learning algorithms and final NN processing can help to convert compound "insect eye" image into format that is more suitable for humans.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated above should not be interpreted as limits to the present invention, and the scope of the invention is to be determined by reference to the claims that follow.

What is claimed is:

1. A camera module comprising:
    a circuit board;
    an image sensor mounted on the circuit board and electrically connected with the circuit boards, the image sensor comprising an array of focal planes;
    a barrel mounted on the circuit board with a cavity formed between the barrel and the circuit board, the image sensor being received in the cavity; and
    a lens stack array mounted to the barrel and spaced from the image sensor, the lens stack array comprising a plurality of first lens stacks and second lens stacks, each of the lens stacks corresponding to one of the focal planes;
    wherein the first lens stacks and the second lens stacks have different field of view;
    the lens stack array further comprises a first lens plate, a spacer plate, a second lens plate which defines a plurality of coaxial apertures, each of the lens stacks comprises a pair of lenses respectively attached in a corresponding aperture of the first lens plate and the second lens plate;
    at least one of the lens stacks is tilted relative to a normal line of the focal plane and the at least one of the lens stacks is rotatable relative to the first and second lens plates.

2. The camera module of claim 1, wherein at least one of the lens stacks is tilted relative to a normal line of the focal plane.

3. The camera module of claim 1, wherein one of the second lens stacks is tilted relative to a normal line of the focal planes in a clockwise direction and another of the second lens stacks is tilted relative to the normal line of the focal planes in an anticlockwise direction.

4. The camera module of claim 1, wherein the lens stack array is a micro-lens stack array comprises a plurality of micro lens.

5. The camera module of claim 1, wherein the camera module further comprises a plurality of third lens stacks which have field of view different from that of the first and second lens stacks.

6. The camera module of claim 5, wherein the first lens stack is formed by ultra-wide micro-lenses stacked one above the other, the second lens stack is formed by wide micro-lenses stacked one above the other and the third lens stack is formed by telephoto micro-lenses stacked one above the other.

7. The camera module of claim 1, wherein the camera module further comprises an IR cut filter located between the image sensor and the lens stack array.

* * * * *